(Model.)

W. WEISS.
CAN OPENER.

No. 245,590. Patented Aug. 9, 1881.

WITNESSES:
C. Neveux
C. Sedgwick

INVENTOR:
W. Weiss
BY Munn & Co
ATTORNEYS.

UNITED STATES PATENT OFFICE.

WILLIAM WEISS, OF NEW ORLEANS, LOUISIANA, ASSIGNOR TO HIMSELF AND JAMES A. RENSHAW, OF SAME PLACE.

CAN-OPENER.

SPECIFICATION forming part of Letters Patent No. 245,590, dated August 9, 1881.

Application filed June 21, 1881. (Model.)

*To all whom it may concern:*

Be it known that I, WILLIAM WEISS, of New Orleans, in the parish of Orleans and State of Louisiana, have invented a new and Improved Can Opener and Cover, of which the following is a full, clear, and exact description.

The object of my invention is to provide a new, improved, and simple device for opening tin cans, which device can be used as a cover for the opened cans.

The invention consists in a circular plate of metal provided with a flange, and with a pointed or sharp-edged tooth or stud a short distance back of the edge, and projecting in the same direction as the flange, and with a handle on the opposite surface, which plate is pressed upon the head of the can, so that the stud will pass through the head, upon which the plate is turned by means of its handle, causing the sharp stud to make a circular cut in the head of the can.

Figure 1:
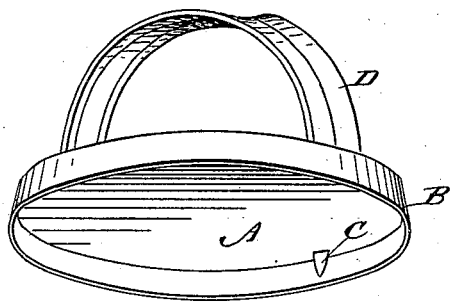
Figure 2:
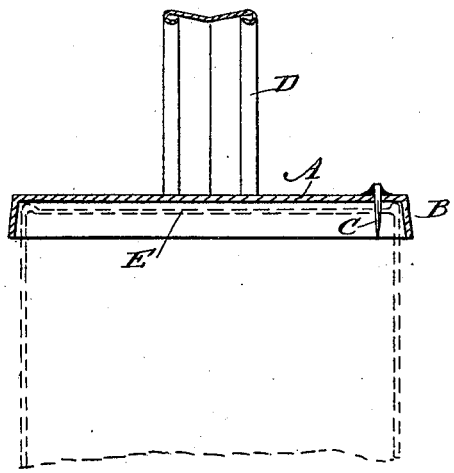

In the accompanying drawings, Figure 1 is a perspective view of my improved can-opener. Fig. 2 is a cross-sectional elevation of the same.

A circular plate, A, is provided with a flange, B, and with a pointed and sharp-edged tooth or stud, C, projecting in the same direction as the flange, and set back a short distance from the same, this stud projecting from the lower surface of the plate. A handle, D, of some suitable shape, is attached to the upper surface of the plate A. This can-opener can be used as a cover for the opened cans.

The device is used in the following manner: The plate A is pressed on the head E of a can until the pointed stud C is forced through this head, upon which the plate A is turned by means of the handle D, thus causing the stud C to make a circular cut in the head E of the can, so that a circular piece can be removed from this head. The flange B serves to prevent the plate A from slipping off the can.

Having thus described my invention, I claim as new and desire to secure by Letters Patent—

The circular plate A, having handle D, a peripheral flange, B, and near the edge of the plate a sharp-pointed blade, C, as shown and described, whereby the device may serve both for a can-opener and a cover, as set forth.

WILLIAM WEISS.

Witnesses:
 A. PITOT, Jr.,
 G. LEGARDEUR, Jr.